United States Patent [19]
Boggs et al.

[11] Patent Number: 6,122,409
[45] Date of Patent: *Sep. 19, 2000

[54] SYSTEM AND METHOD FOR DIGITALLY CAPTURING A PRODUCT IMAGE

[75] Inventors: Eddie Boggs, Asheboro; Juan Cano, Kernersville, both of N.C.; Frank W. Fang, Great Falls, Va.; Jochen Fisher, Elon College, N.C.; Ash Harrison; Andy Huang, both of Greensboro, N.C.

[73] Assignee: MCI Communications Corporation, Washington, D.C.

[ * ] Notice: This patent issued on a continued prosecution application filed under 37 CFR 1.53(d), and is subject to the twenty year patent term provisions of 35 U.S.C. 154(a)(2).

[21] Appl. No.: 08/921,419

[22] Filed: Aug. 29, 1997

[51] Int. Cl.[7] .................................................. G06K 9/36
[52] U.S. Cl. ........................ 382/276; 382/286; 382/305; 348/552; 700/83
[58] Field of Search ................................... 348/207, 159, 348/64, 211–213, 231–233, 552, 372–373; 345/339, 340, 348, 352; 382/141–144, 286, 190, 298–299, 305–306; 235/375, 472.01, 470, 462.01, 472.02; 700/83; 705/26, 27

[56] References Cited

U.S. PATENT DOCUMENTS

| | | | |
|---|---|---|---|
| 4,992,866 | 2/1991 | Morgan | 348/159 |
| 5,010,499 | 4/1991 | Yee | 348/552 |
| 5,428,389 | 6/1995 | Ito et al. | 348/231 |
| 5,477,264 | 12/1995 | Sabadhikari et al. | 348/231 |
| 5,581,299 | 12/1996 | Raney | 348/64 |
| 5,640,468 | 6/1997 | Hsu | 382/190 |
| 5,815,205 | 9/1998 | Hashimoto et al. | 348/373 |
| 5,821,523 | 10/1998 | Bunte et al. | 235/470 |
| 5,825,009 | 10/1998 | Schmid et al. | 235/375 |
| 5,905,496 | 5/1999 | Lau et al. | 345/339 |
| 5,918,213 | 6/1999 | Bernard et al. | 705/26 |

*Primary Examiner*—Leo H. Boudreau
*Assistant Examiner*—Ishrat Sherali

[57] ABSTRACT

A system for digitally capturing a product image includes a digital camera, a computer interfaced with the digital camera and programmed to provide a graphical interface including indicators relating to the exposure setting of the camera, the resolution image size of the image to be captured and the product identification number. The camera is controlled through the operation of a pointing device, such as a mouse and "buttons" displayed on the interface including setting the camera in a remote control mode, capturing a product image, selecting an image resolution, saving an image and resetting the system for digital capture of the next product image. A sensing device such as a bar code scanner is provide for recording the product number and inputting the number into the computer. Captured product image data is saved to a database along with product dimensions. One or more processors are used to process the data to crop, resize and silhouette the product image. The final product image is stored on storage media such magnetic tape or a compact disk for subsequent use. The final image may be used for electronic advertising, for example over the Internet, for preparing transparencies and for preparing conventional printed advertisements.

20 Claims, 5 Drawing Sheets

SYSTEM AND METHOD FOR DIGITALLY CAPTURING A PRODUCT IMAGE

BACKGROUND OF THE INVENTION

The present invention relates generally to a system for quickly capturing and storing high and low resolution images of a product and manipulating the images based upon product specifications.

DISCUSSION OF THE RELATED ART

The advent of digital photography and electronic merchandising has provided merchants, vendors and retailers with new opportunities for presenting their products to the purchasing public. In order to fully exploit this opportunity, however, the retailer or vendor needs to be able to visually present their products to the purchasing public, either through conventional means such as catalogs or via electronic mediums such as the Internet. Further, it may in some cases be desirable to store visual representations of products on media such as compact disks in order to utilize the advantages of digital technology, such as compact storage media, ease of reproduction and transmission and computerized manipulation of images and data. Thus, there exists a need for an image capture and workflow management system that utilizes the advantages provided by digital technology.

SUMMARY OF THE INVENTION

The present invention provides a system and method for product image capture and management. The system includes a digital camera and a computer for controlling the operation of the camera. The computer includes a display device such as a CRT. The CRT displays a graphical interface that is used, along with a pointing device, for controlling the operation of the camera.

Through the use of the interface one or more views of the particular product are capture. The captured image data is saved in a database. The graphic interface also provides means to select whether a high or low resolution image is captured and saved. Product dimensions are also obtained, input, and saved to the database. The product image and dimensional data is shown. Product image data and product dimensional data (steps 100 and 102) are stored on the database. The product image may be cropped, resized and silhouetted against the desired background. Normally the product image is silhouetted against a background so that in the final product image, the product appears to be positioned on a shelf, hanger or display rack in the same fashion as it would be displayed in a store. A final cropping operation is performed and, if desired, a transparency image is prepared with a bit flop operation. The final product image is then stored on magnetic media such as a compact disk or magnetic tape for subsequent use.

DETAILED DESCRIPTION OF THE PREFERRED EMBODIMENTS

Figure 1:
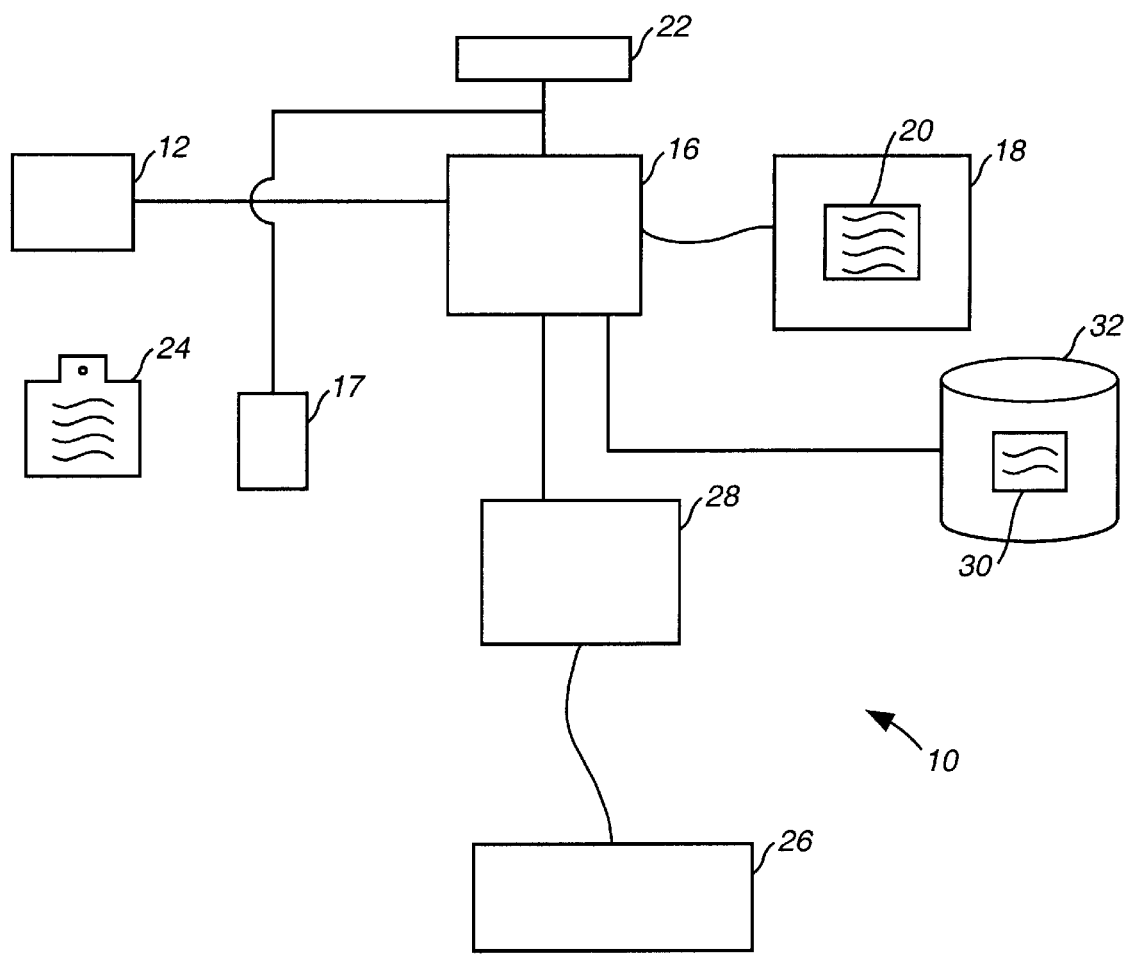
FIGS. 1 and 2 are schematic representations of the components of one embodiment of the system of the present invention.
Figure 2:
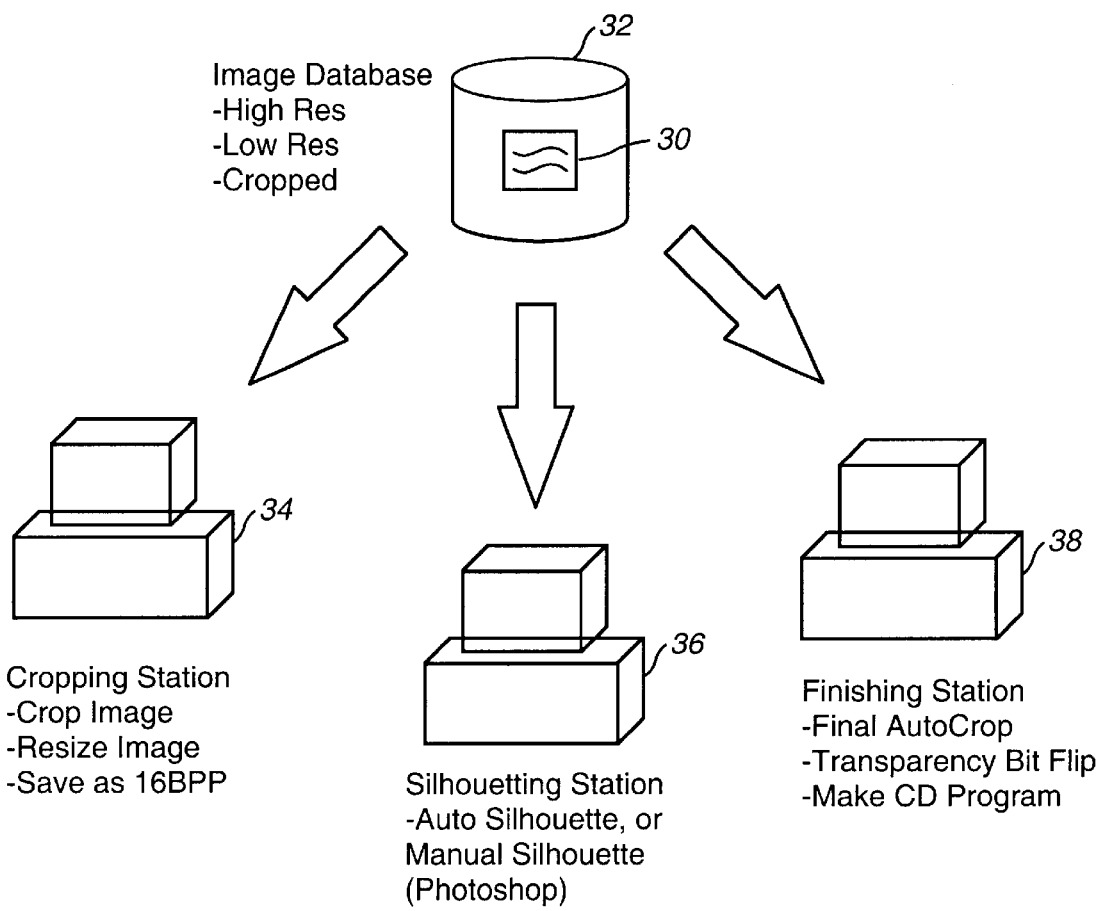

Referring now to FIGS. 1 and 2 a first portion 10 of the system of the present invention is schematically illustrated. A camera 12, preferably, a digital camera, is interfaced with a first computer 16 via an RS232 or similar digital interface. The computer 16 includes CRT 18 including a graphical display and interface 20 with camera 12 and a data input, pointing, and/or manipulation device or devices 22 such as a keyboard, mouse, i.e. graphical interface pointing device, or similar device. The product 24 to be imaged is positioned at the appropriate location relative to the camera 12 to enable the image of the product to be captured by the camera 12 and digitally transmitted to the computer 16. In one embodiment of the invention, the computer 16 interfaces with a bar code scanner 17 which is utilized to identify the particular product or product identification number.

The captured data may comprise a high resolution image, a low resolution image, front, back, side and top images, in and out of box images, products displayed in trays and in other configurations, a cropped image and/or a combination of the foregoing. By means of example, the product 24 may be a garment, an automotive part, a tool or virtually any other product.

In order to depict the product 24 in the most advantageous manner, it may be desirable to input product dimensions for use in further processing of the image data. Therefore, the system may be optionally equipped with a second data input and manipulation device 26, which may be a keyboard, mouse or similar device. In one embodiment of the present invention, the dimensions may include the height, width and depth of the product or the product package. As illustrated in FIG. 1, the second input device is operatively connected to a second computer 28. Of course, as will be appreciated by those skilled in the art, the functions of the first computer 16 and second computer 26 may be combined in a single data processing unit, in which case, the second input device would be connected directly to the processing unit. The product image or images are stored in a database 30 resident on storage device 32 for further processing as desired. Optionally, product dimensions input via data input device 26 are also stored in the database 30.

As best illustrated in FIG. 2, after the image and dimensional are stored, the data may be manipulated in a number of ways to produce the desired final image. A cropping station processor 34 may be used to crop, resize and store the image. A silhouetting station processor 36 may be used to automatically or manually silhouette the product image against a desire background. A finishing station processor 38 is utilized to perform a final automatic cropping function, prepare a digitalized transparency image via a bit flip and create an image program or record for recording the image on a compact disk or magnetic media. As will be appreciated by those skilled in the art, cropping station 34, silhouetting station 36 and finishing station 38 may each comprise individual processors, i.e. computers, for automatically processing the image and dimensional data or the individual processors may be incorporated into a single unit. Alternatively, one or more of the functions may be performed manually.

Figure 3:
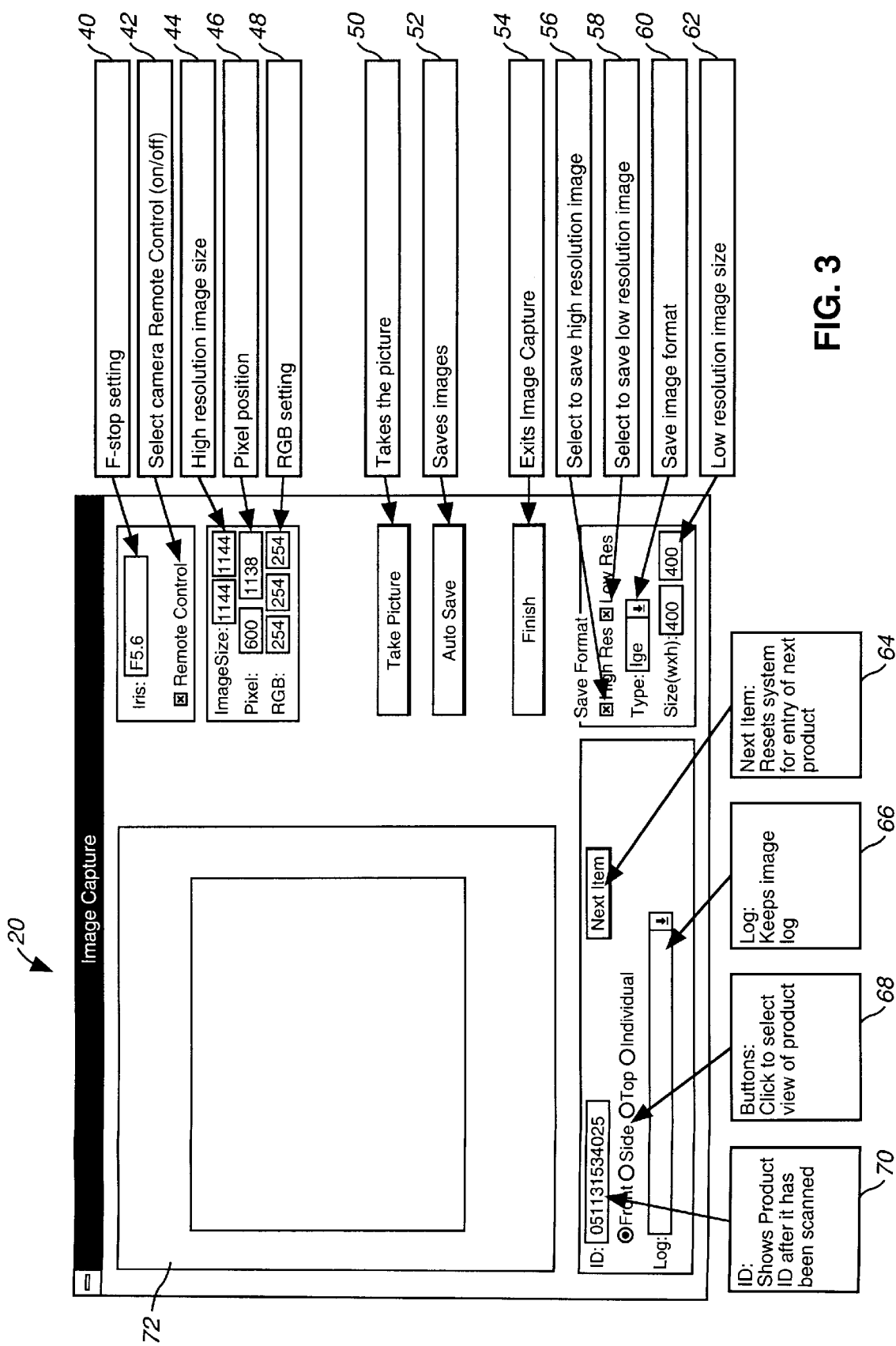
FIG. 3 is an illustration of the graphic interface used in the practice of the present invention.

Referring now to FIG. 3, the graphical interface 20 utilized in the system and method of the present invention is illustrated in detail. As illustrated, in FIG. 3 an image 72 of the particular product is displayed on the interface. The graphical interface includes the selected F-stop setting 40 of the camera 12, a selected high resolution image size 44, pixel position or setting 46 and RGB setting 48. The interface includes additional controls such as a representation of a "button" 42 that may be used to select remote control of the camera 12 by the computer 16 through the use of a graphical pointing device such as a mouse or a conventional keyboard.

The graphical interface also includes buttons for: taking a picture 50; saving an image 52; exiting the image capture mode 54; a function for selecting a high resolution image to be saved 56; a function for selecting a low resolution image to be saved 58; a function for saving the image format 60; and a function for selection a low resolution image size 62. Other functional features provided by the graphical interface include: the product identification number 70; buttons 68 to select a front, top or side view of the product; an image log 66; and "next item" button that resets the system for image capturing of the next product. Additionally, the interface may provide other options, (not shown), including silhouetting against a selected solid background such as black or blue. The image log 66 button provides a means of recalling and reviewing prior images recorded earlier during the particular recording sesssion.

Figure 4:
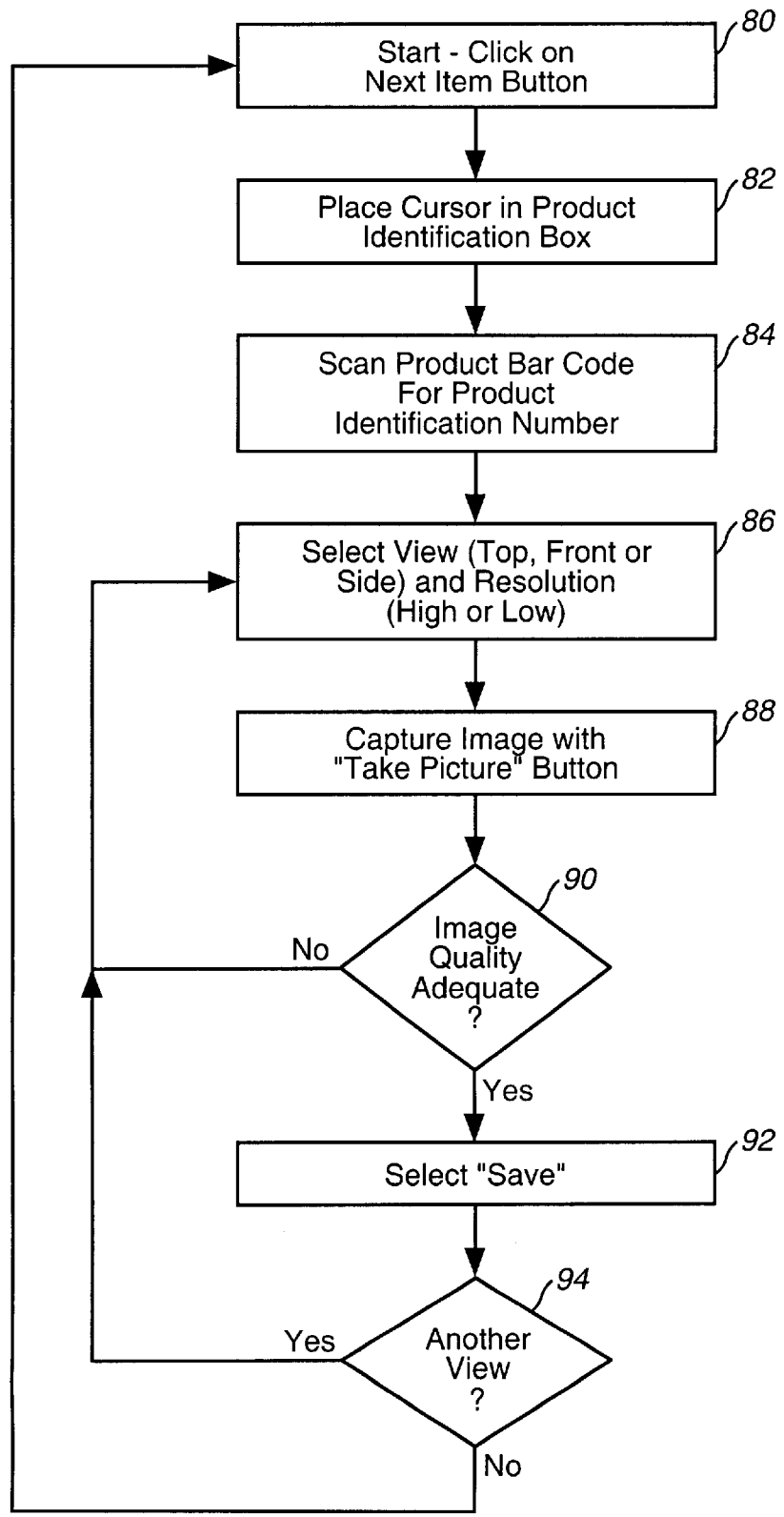
FIGS. 4 and 5 are flowcharts illustrating the steps employed in the practice of one embodiment of the system of the present invention.

Turning now primarily to FIG. 4 in conjunction with FIG. 3, a method of a first embodiment of the present invention is presented. The system is initialized by clicking button 64 to reset the system (step 80) for data entry of a next product. The mouse or pointing device is utilized to position the cursor within the product identification box 70 of the graphical interface (step 82). The bar code of the product to be imaged is then scanned (step 84) utilizing a hand held or stationary scanner 17 and transmitted to computer 16 (FIG. 1). Alternatively, the product identification number may be entered manually, using input devices 22 or 26. After the product has been identified, the user selects the particular view of the product to be captured and the resolution of the image (step 86) with mouse or pointing device activated view buttons 68 and resolution select buttons 56 and 58. The image is captured with camera 12 (step 88) via activation of using the "take picture" button 50 of graphical interface 20.

After the image has been captured, the image quality is checked (step 90), either by the user or automatically using a preprogrammed quality check function resident on computer 16. If the quality of the captured image is adequate, the image is saved (step 92) to database 30 using the "saves images" button 52 of graphical interface 20. If the image is not adequate, the process is repeated from step 86. After the image has been saved, the user then determines whether a different view of the product is to be taken (step 94), and if so, the process is repeated from step 86. If not, the system is re-initialized (step 80).

Referring back to FIG. 2, after the product image and dimensional has been captured, the data may be automatically manipulated. The image data may be cropped, resized and silhouetted. Transparencies may be prepared and the data recorded on a compact disk or magnetic media for subsequent use.

Figure 5:
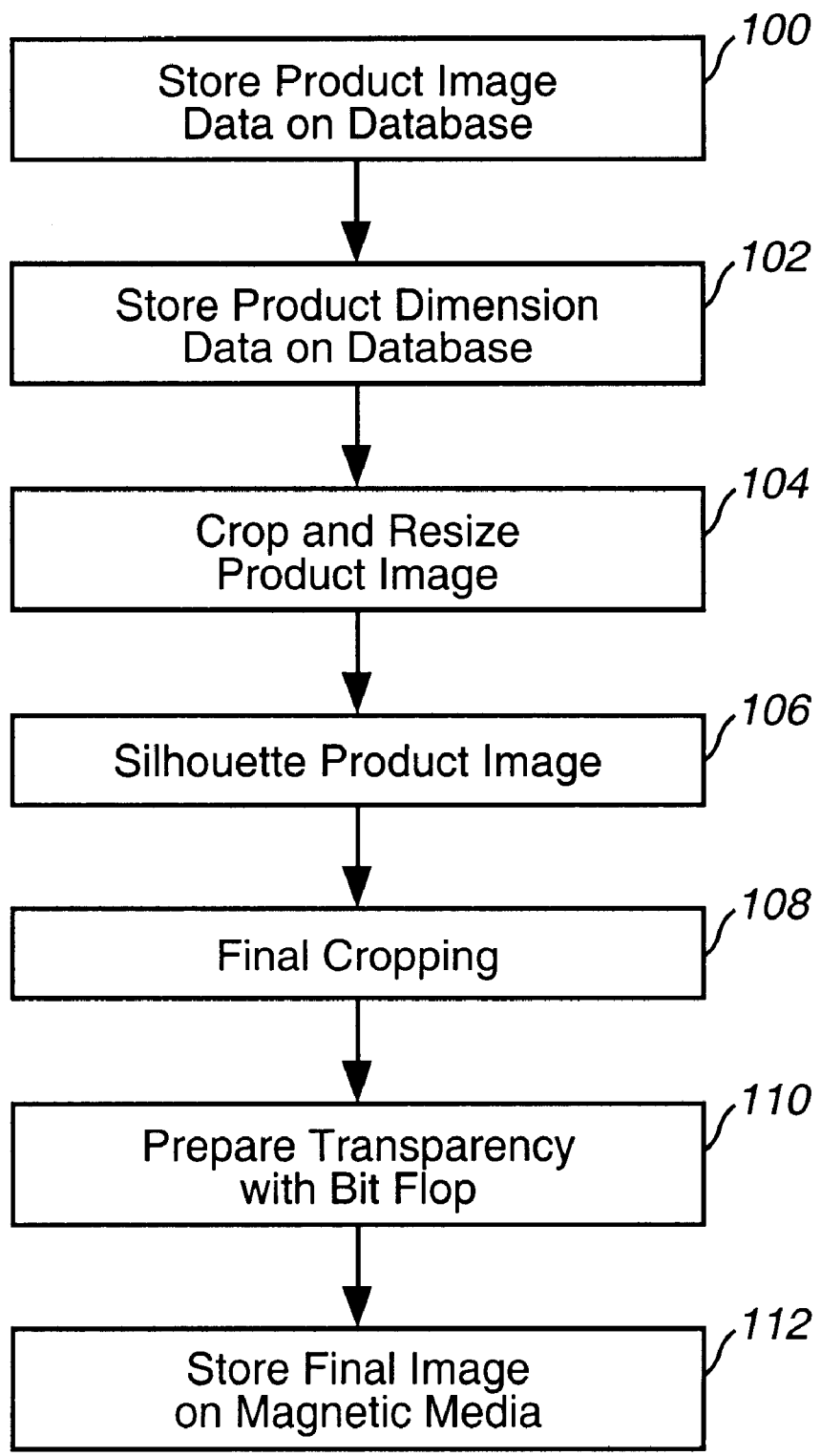

Referring now to FIG. 5, a flowchart illustrating the processing of the product image and dimensional data is shown. Product image data and product dimensional data (steps 100 and 102) are stored on database 30 (FIG. 2). The product image is cropped and resized (step 104). The product image is then silhouetted against the desired background (step 106). Normally the product image is silhouetted against a background so that in the final product image, the product appears to be positioned on a shelf, hanger or display rack in the same fashion as it would be displayed in a store. A final cropping operation is performed (step 108) and if desired, a transparency image is prepared with a bit flop operation (step 110). The final image is then stored on storage media (step 112) such as a compact disk or magnetic tape for use.

While the present invention has been disclosed and discussed in connection with the above-described embodiment, it will be apparent to those skilled in the art that numerous changes, variations and modifications within the spirit and scope of the invention are possible. Accordingly, it is therefore, intended that following claims shall encompass such variations and modifications.

What is claimed is:

1. A system for digitally capturing an image of a product having a product identification number, the system comprising:
   (a) a digital camera;
   (b) a computer interfaced with the digital camera, the computer being programmed to provide a graphic interface with the digital camera,
   (c) means for inputting dimensional data of the product in a database connected to and accessed by said computer, said dimensional data being used to produce a final image of the product;
   (d) the graphical interface providing indicators relating to the exposure setting of the digital camera, the resolution of the image to be captured and the product identification number;
   (e) the graphical interface including a controller for operation of the digital camera including setting the camera in a remote control mode, capturing the product image, selecting the resolution, saving the product image and resetting the system for capture of another product image.

2. The system of claim 1 further comprising a sensing device communicably coupled to the computer for identifying the product identification number.

3. The system of claim 2 wherein the sensing device comprises a bar code scanner.

4. The system of claim 1 wherein the graphical interface is capable of selecting one of a plurality of views of the product.

5. The system of claim 4 wherein the graphical display provides a interface for selecting a front, top, back, bottom or side view of the product.

6. The system of claim 1 further comprising a database for storing image and dimensional data of the product.

7. The system of claim 1 wherein the graphical interface includes a product image.

8. The system of claim 7 wherein the image and dimensional data of the product are processed.

9. The system of claim 8 wherein the product image is cropped, resized and silhouetted.

10. A method of digitally capturing a product image, the method comprising the steps of:
    (a) utilizing a sensing device communicably coupled to a computer for identifying a product identification number, the computer being interfaced with a digital camera and providing a graphical interface with the digital camera;
    (b) utilizing the graphical interface to control the computer to capture the product image, said graphical interface providing indicators relating to the exposure setting, the resolution of the image to be captured, and the product identification number;
    (c) inputting dimensional data of the product into the computer using an input device, said dimensional data being used to produce a final image of the product; and
    (d) storing product image data and product dimensional data in a database.

11. The method of claim 10 wherein the step utilizing a sensing device communicable coupled to a computer for identifying the product identification number of sensing device (a) further comprises identifying the product identification number by a bar code scanner.

12. The method of claim 10 wherein the step (b) further comprises selecting one of a plurality of views of the product.

13. The method of claim 10 further comprising the step of capturing multiple product images.

14. The method of claim 13 wherein the step of capturing multiple product images further comprises capturing images corresponding to front, top and side views of the product.

15. The method of claim 10 further comprising the step of selecting a high or low resolution product image for storage in a database.

16. The method of claim 10 wherein the step of processing the product image and dimensional data includes the step of cropping the product image, resizing the product image and silhouetting the product image.

17. The method of claim 16 further comprising the step of storing the processed image on magnetic media.

18. A method of digitally capturing a product image, the method comprising the steps of:
   (a) utilizing a device communicably coupled to a computer for identifying a product identification number, the computer being interfaced with a digital camera and providing a graphical interface with the digital camera;
   (b) utilizing the graphical interface to control the computer to capture multiple images of the product, said graphical interface providing indicators relating to the exposure setting of the digital camera, the resolution of the image to be captured and the product identification number;
   (c) storing the multiple images of the product in a database;
   (d) inputting dimensional data of the product into the computer using an input device;
   (e) storing product dimension data in the database;
   (f) processing the product image and product dimensional data to produce a final product image; and
   (g) storing the final product image in electronic form.

19. The method of claim 18, wherein the final product image is stored on magnetic media.

20. The method of claim 18, wherein the final product image is stored on optical disk.

* * * * *